United States Patent
Mukter-Uz-Zaman et al.

(10) Patent No.: US 9,024,509 B2
(45) Date of Patent: May 5, 2015

(54) DEVICE FOR MAXIMUM DETECTION OF VIBRATING ENERGY FOR HARVESTING ENERGY

(75) Inventors: A. S. M. Mukter-Uz-Zaman, Kuala Lumpur (MY); Othman Masuri, Kuala Lumpur (MY); Shaharia Bhuyan Mohammad, Kuala Lumpur (MY); Hakimin Zainuddin Khairul, Kuala Lumpur (MY); Sulaiman Suraya, Kuala Lumpur (MY); Santoso Tamsir Agus, Kuala Lumpur (MY)

(73) Assignee: Mimos Berhad, Kuala Lumpur (MY)

( * ) Notice: Subject to any disclaimer, the term of this patent is extended or adjusted under 35 U.S.C. 154(b) by 1011 days.

(21) Appl. No.: 13/121,529

(22) PCT Filed: Sep. 10, 2009

(86) PCT No.: PCT/MY2009/000141
§ 371 (c)(1),
(2), (4) Date: Oct. 17, 2012

(87) PCT Pub. No.: WO2010/036089
PCT Pub. Date: Apr. 1, 2010

(65) Prior Publication Data
US 2013/0062999 A1    Mar. 14, 2013

(30) Foreign Application Priority Data
Sep. 29, 2008  (MY) .............................. PI 20083859

(51) Int. Cl.
*H01L 41/113* (2006.01)
*H02N 2/18* (2006.01)

(52) U.S. Cl.
CPC ................................... *H02N 2/186* (2013.01)

(58) Field of Classification Search
USPC ........................................................ 310/339
See application file for complete search history.

(56) References Cited

U.S. PATENT DOCUMENTS

| | | | | |
|---|---|---|---|---|
| 7,886,575 | B2 * | 2/2011 | Haskell et al. | 73/24.01 |
| 8,067,878 | B1 * | 11/2011 | Lu et al. | 310/339 |
| 2006/0087200 | A1 | 4/2006 | Sakai | |
| 2010/0207491 | A1 * | 8/2010 | Gammaitoni et al. | 310/339 |

(Continued)

FOREIGN PATENT DOCUMENTS

| | | |
|---|---|---|
| JP | 11303726 | 11/1999 |
| JP | 2005273644 | 10/2006 |
| JP | 2008192944 | 8/2008 |

*Primary Examiner* — Thomas Dougherty
(74) *Attorney, Agent, or Firm* — Bill C. Panagos; J. Scott Martin; Butzel Long, PC

(57) ABSTRACT

An energy harvesting device (100) comprises a hollow prismatic body (12) formed of a plurality of faces are coated with a piezoelectric layer thereon, a plurality of elongated cantilevers (14) are arranged spatially from each other and inserted through the faces of the hollow prismatic body (12), the elongated cantilevers (14) are coated with a piezoelectric layer thereon, and at least one inner resilient means (16) of a particular stiffness having one end attached the hollow prismatic body (12) and the other end is coupled with a base (18) in order to stabilize the device on its axis. The device (100) is capable of detecting small amounts of environmentally available vibration sources and producing huge vibration to the hollow prismatic body (12) and the cantilevers (14), thereby inducing the device (100) to generate electrical energy that can be stored or used by an exteranl load.

19 Claims, 3 Drawing Sheets

(56) References Cited

U.S. PATENT DOCUMENTS

| | | | |
|---|---|---|---|
| 2010/0308691 A1* | 12/2010 | Hayamizu | 310/339 |
| 2012/0074815 A1* | 3/2012 | Jean-Mistral | 310/339 |
| 2013/0057111 A1 | 3/2013 | Mukter-Uz-Zaman et al. | |
| 2013/0062999 A1* | 3/2013 | Muker-Uz-Zaman et al. | 310/339 |
| 2013/0068302 A1* | 3/2013 | Muker-Uz-Zaman et al. | 136/259 |

* cited by examiner

DEVICE FOR MAXIMUM DETECTION OF VIBRATING ENERGY FOR HARVESTING ENERGY

CROSS REFERENCE TO RELATED APPLICATIONS

The present application is a 35 U.S.C. §371 national stage filing of International Patent Application No. PCT/MY2009/000141, filed Sep. 10, 2009, and through which priority is claimed to Malaysian Patent Application No. PI20083859, filed Sep. 29, 2008, the disclosures of which are incorporated herein by reference in their entireties.

FIELD OF INVENTION

This invention relates generally to an energy harvester. More specifically, this invention relates to a device that is capable of producing huge vibration to the attached body from environmentally available very small amount of vibration.

BACKGROUND OF THE INVENTION

Small powered devices (such as sensors, routers, gateway, etc.) are deployed on the open plantation for profiling the environment conditions, using wireless sensor network (WSN) which is usually off the power supply grid. Normally, these small devices are powered by batteries. However, as batteries have limited capacity and lifetime, it is in need to replace or recharge batteries regularly. As in WSN the numbers of devices are in thousands, replacing batteries is simply not practical. Thus, for realistic deployment of WSN it is necessary to make the entire WSN component is capable of energy harvesting from its ambient sources.

One of the sources of harvesting energy is from mechanical induced vibration that converts the mechanical energy to electrical energy. This vibrating energy is captured from mechanical movement of different elements such as piezoelectric, electrostatic or electromagnetic. Usually, an apparatus that can harvest energy from mechanical movement is attached with a vibrating body or machine (such as engine, running vehicle, rotating machinery etc). However one of the bottlenecks of vibrating energy harvesting is the availability of vibrating sources especially in the distant plantation. Therefore, a novel design of apparatus required to produce huge vibration from ambient low vibrating sources.

With rapid development in remote and wireless sensor networks, batteries are becoming the limiting factor in the lifetime of the device. Besides, for self-contained sensors and processing circuits, renewable on-board power supply is required, to become truly autonomous. One way to recharge battery in the system is through energy harvesting and a common method to harvest energy is from vibrations, a procedure to convert ambient vibration energy into electricity through the use of piezoelectric, electrostatic or electromagnetic materials.

Conventionally to induce mechanical vibration, apparatus capable of energy harvesting from vibration are attached with highly vibrating sources. But, in distant plantation, the availability of high vibrating body is completely uncertain and most of the time impossible. Therefore, an apparatus is required that amplify very small vibration available from the ambient. Besides, if the apparatus is capable of producing any auxiliary vibration the system will easily reach its resonance frequency from a very small amount of external vibration.

SUMMARY OF THE INVENTION

Accordingly, one object of the present invention is to provide an energy harvesting device comprises a hollow prismatic body formed of a plurality of faces are coated with a piezoelectric layer thereon; a plurality of elongated cantilevers are arranged spatially from each other and inserted through the faces of the hollow prismatic body, the elongated cantilevers are coated with a piezoelectric layer thereon; and at least one inner resilient means of a particular stiffness having one end attached the hollow prismatic body after determined the centre of gravity and mass of the hollow prismatic body and the other end attached to a base in order to be stable on its axis, wherein the device is capable of detecting small amount of environmentally available vibration sources and producing huge vibration to the hollow prismatic body and the cantilevers, thereby inducing the device to generate electrical energy.

It is the object of the present invention to provide a protection shield to cover the hollow prismatic body, the cantilevers and the inner resilient means.

It is another object of the present invention is to provide an outer resilient means and a cube-shaped mass arranged in parallel and attached in between the inner resilient means and the base.

It is another object of the present invention is to provide the cantilever comprises a plurality of electron collectors at the top side of the piezoelectric layer of the cantilever to collect the released electrons from the vibrating cantilevers and convert the collected electrons to electrical energy by the voltage regulating circuitry.

DETAILED DESCRIPTION OF THE INVENTION

Figure 1:
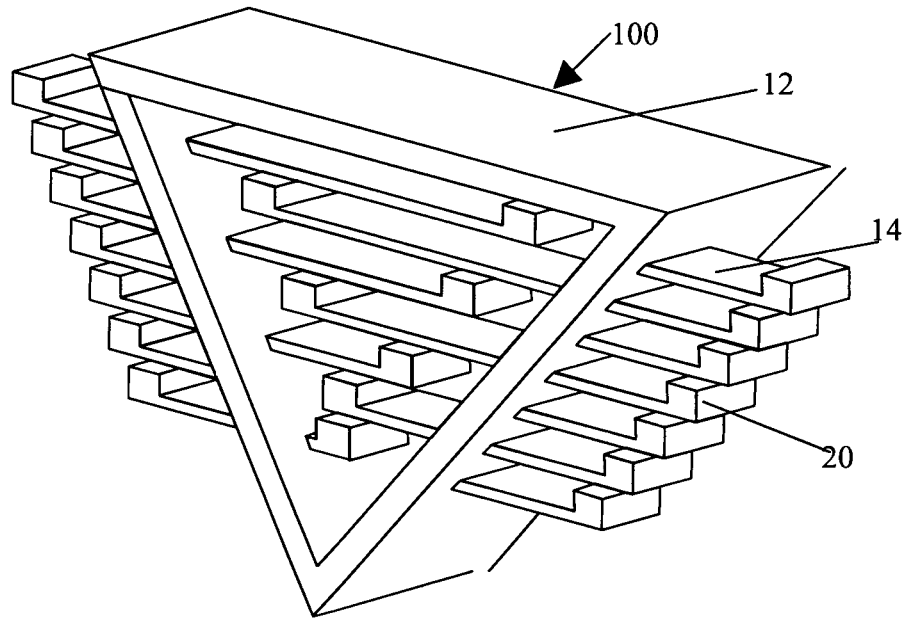
FIG. 1 is a perspective view of an energy harvesting device in an inverted hollow triangular prism shape with cantilever structures attached thereof in accordance with one embodiment of the present invention.

The present invention relates to an energy harvesting device (100) that is capable of producing primary and auxiliary vibrations to the attached elements of its body, from very small amount of environmentally available vibration sources (such as from rain drop, wind flow, movement of living being or insect, and even from very small amount of earth vibration). The energy harvesting device (100) comprises a hollow prismatic body (12) formed of a plurality of faces and the faces are coated with a piezoelectric layer thereon. FIG. 1 shows an energy harvesting device (100) comprises a hollow prismatic body (12) in an inverted hollow triangular prism shape with cantilever (14) structures attached thereof in accordance with one embodiment of the present invention. However, the hollow prismatic body (12) is not limited to only triangular shape, but it might be square, rectangular and any other workable shape. The faces of the hollow prismatic body (12) may be coated partially or fully with the piezoelectric layer. A plurality of elongated cantilevers (14) arranged spatially from each other through the inclined faces of the hollow prismatic body (12), the elongated cantilevers (14) are coated with a piezoelectric layer thereon. Preferably, each elongated cantilever (14) further comprises proof mass (20) at its sides. If the cantilever (14) size is long (length 4 times higher than width), it does not require additional proof mass (20) to reach the resonance frequency. The elongated cantilever (14) is made of materials including but not limited to metal and silicon.

Figure 2:
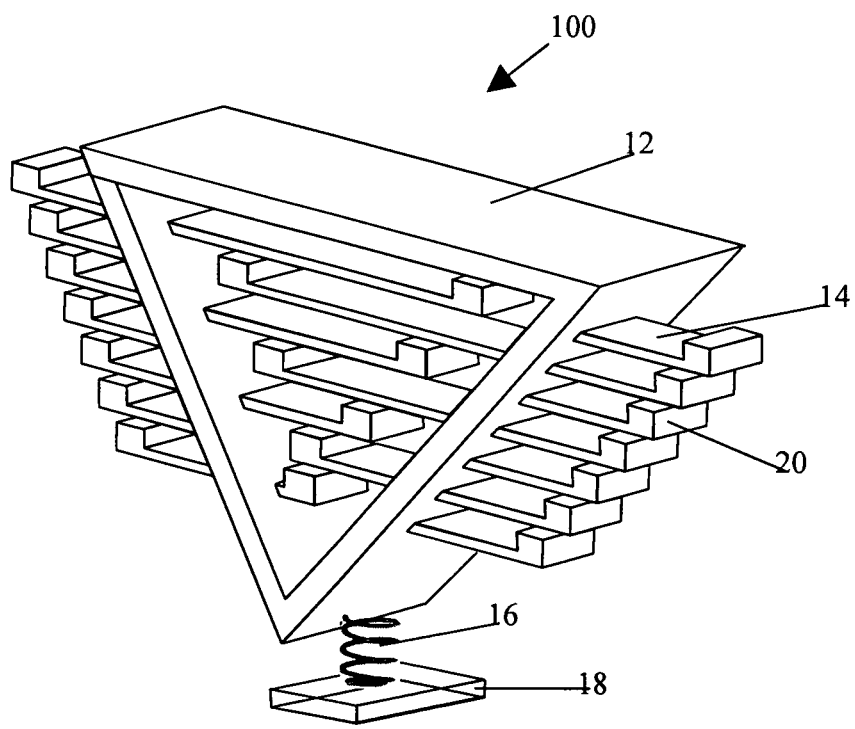
FIG. 2 is a perspective view of the energy harvesting device in an inverted hollow triangular prism shape of FIG. 1 is placed on top of an inner resilient means in accordance with one embodiment of the present invention.

FIG. 2 shows the energy harvesting device (100) comprises at least one inner resilient means (16) of a particular stiffness having one end attached the hollow prismatic body (12) after determined the centre of gravity and mass of the hollow prismatic body (12) and the other end attached to a base (18) in order to be stable on its axis. The elongated cantilevers (14) inserted through the faces of the hollow prismatic body (12) which are in an inclined orientation. Normally, the centre of gravity and mass of the hollow prismatic body (12) is at the lowest point of the inverted hollow triangular prism in accordance with one embodiment of the present invention. It is found from analysis that if the spring placed by considering the center of mass and gravitation of the structure, it can produce even better vibrations. The incorporation of the inner resilient means (16) will further enhance the level of vibration to produce even higher output power. The appropriate sized and weighted structure of the hollow prismatic body (12) on top the inner resilient means (16) is structurally stable on its axis. The hollow prismatic body (12) is capable of detecting small amount of environmentally available vibration sources and producing huge vibration to the hollow prismatic body (12) and the cantilevers (14), thereby inducing the device (100) to generate electrical energy.

Figure 3:
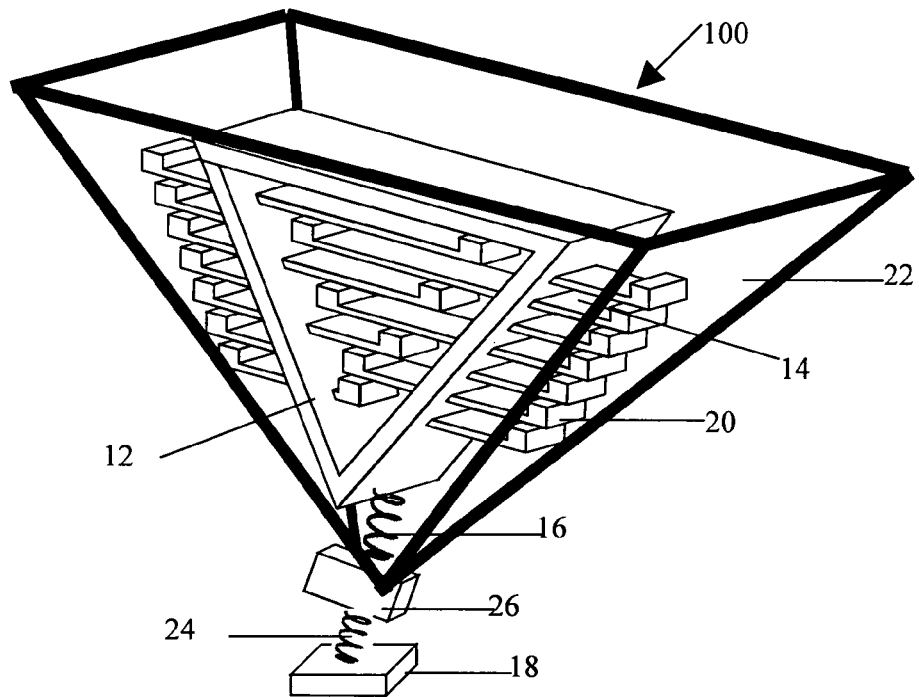
FIG. 3 is a perspective view of the energy harvesting device in an inverted hollow triangular prism shape of FIG. 2 is attached with a cube-shaped mass and an outer resilient means in accordance with one embodiment of the present invention.

FIG. 3 shows an outer resilient means (24) and a cube-shaped mass (26) arranged in parallel and attached in between the inner resilient means (16) and the base (18). The reason for installing the outer resilient means (24) is to provide an additional resilient means in case the structure is positioned under soil and for any other reasons the outer resilient means (24) cannot be vibrated. In this condition, the inner resilient means (16) will still able to vibrate and the inner resilient means (16) will not come on touch with any things as it is covered inside the protection shield (22). Preferably, the outer and inner resilient means (16) are springs. The energy harvesting device (100) that is capable of producing huge vibration to the attached body from environmentally available very small amount of vibration. Therefore, a small amount of induced vibration is capable of lasting for a long time.

Figure 4:
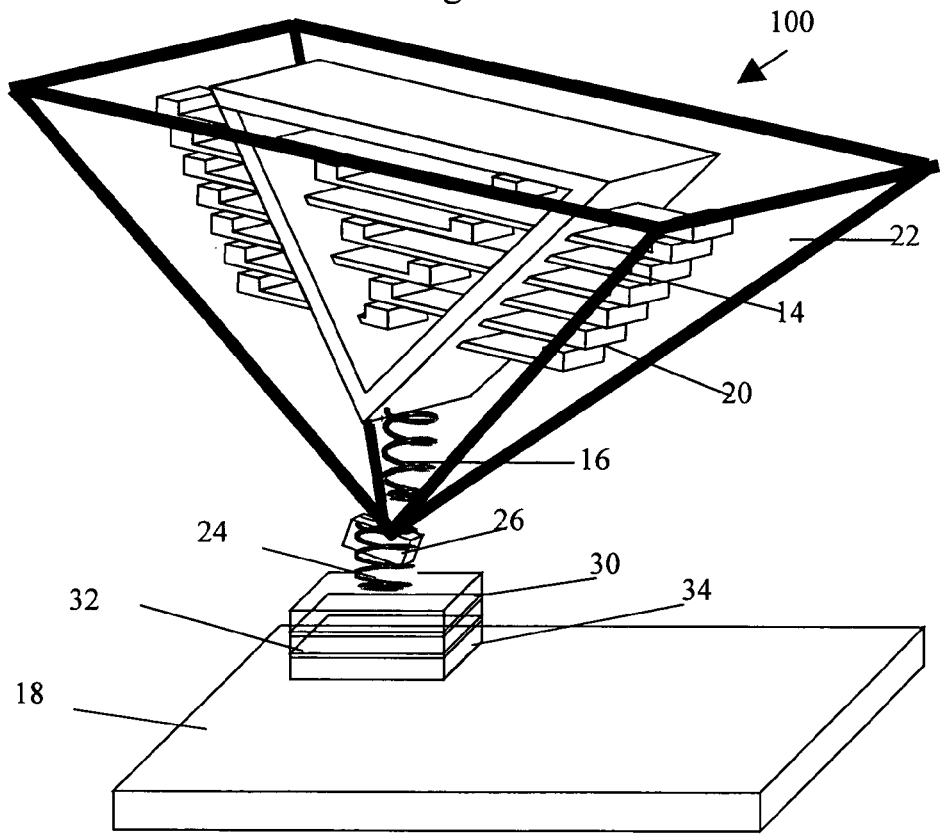
FIG. 4 is a perspective view of the energy harvesting device of FIG. 3 covered by a plastic shield in accordance with one embodiment of the present invention.

FIG. 4 shows a protection shield (22) covering the hollow prismatic body (12), the cantilevers (14) and the inner resilient means (16). The main function of the protection shield (22) to protect the hollow prismatic body (12), the cantilevers (14) and the inner resilient means (16) from damage since it will be positioned in an open environment during its operation. The energy harvesting device (100) may further comprise charging circuitry (30), a storage device (32) (e.g., a battery or super capacitor), voltage regulating circuitry (34) and other electrical components arranged parallel with the base (18) to provide certain roles in converting mechanical energy (vibration) to electrical energy. Conversion of mechanical energy to electrical energy is obtained through the piezoelectric or electrostatic or electromagnetic effect. There are three steps in power generation from piezoelectric materials:

1) Trapping mechanical energy.
2) Converting mechanical energy into electric energy using piezoelectric transducer, (or electrostatic, electromagnetic).
3) Storing the generated electrical energy.

The energy harvesting device (100) can produce mechanical vibration on the attached cantilever (14) from very small amount of naturally available ambient vibration.

Figure 5:
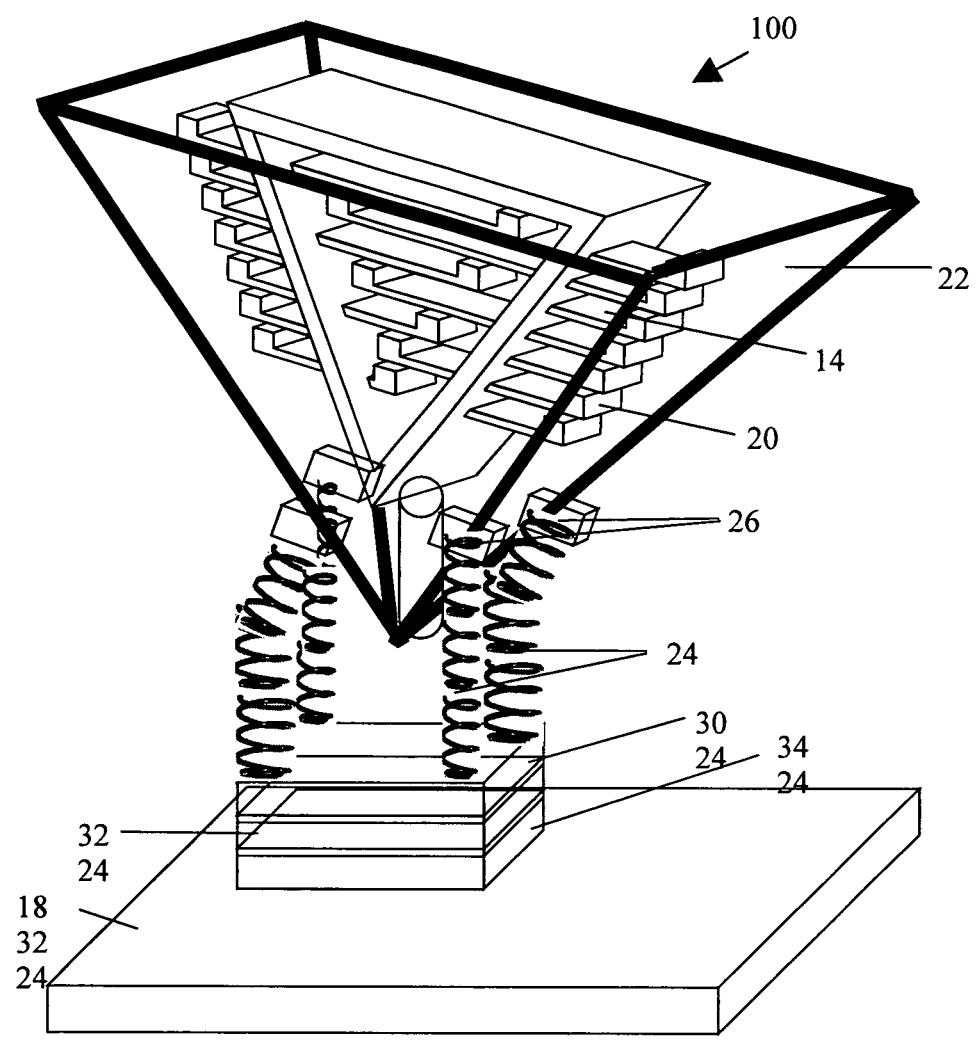
FIG. 5 is a perspective view of the energy harvesting device of FIG. 4 with additional inner resilient means of different stiffness.

FIG. 5 is a perspective view of the energy harvesting device (100) of FIG. 4 with additional outer resilient means (24) of differing stiffness. The outer resilient means (24) are connected after determining the center of mass and the center of gravity of the structure. Each outer resilient means (24) has different stiffness to detect different types of environmentally available vibration sources. By adding additional outer resilient means (24) (i.e., springs) of differing stiffness, the harvester is capable of providing auxiliary vibration to the attached cantilevers (14). With the combination of the normal vibration and the auxiliary vibration, the array of cantilevers (14) are capable of reaching resonance frequency with minimal environmental vibration source input. Moreover, the outer resilient means (24) of differing stiffness are also capable of creating an unstable environment to the attached body, which may maximize the vibration of the cantilevers (14).

The prismatic shape of the device (100) is capable of producing vibration from ambient sources. For example if rain drop fall on the top part of inverted prismatic structure it will vibrate. Once the vibration started the inner triangle structure also vibrate similarly the attached cantilever (14) with the triangle structure also vibrate. The hollow prismatic body (12) is closed and placed on open environment therefore it will block the air flow and thereby gather energy to produce mechanical movement on its body. All other ambient mechanical energy if come in touch of the device (100) will vibrate this will induced vibration to the attached cantilevers (14). The resilient means is attached after determining the center of gravity and center of mass of the floating structure, which provides the structure stability. On this stable structure a very small amount of external force is capable of inducing huge vibration. The device (100) is capable of harvesting energy from ambient low scale vibration. Therefore it is applicable to any kind of energy harvesting where mechanical force in need to converted to electrical energy.

While several particularly preferred embodiments of the present invention have been described and illustrated, it should now be apparent to those skilled in the art that various changes and modifications can be made without departing from the spirit and scope of the invention. Accordingly, the following claims are intended to embrace such changes, modifications, and areas of application that are within the spirit and scope of this invention.

The invention claimed is:
1. An energy harvesting device comprising:
a hollow prismatic body formed of a plurality of faces coated with a piezoelectric layer thereon;
a plurality of elongated cantilevers arranged spatially from each other and inserted through the faces of the hollow prismatic body, the elongated cantilevers coated with a piezoelectric layer thereon;
at least one inner resilient means of a particular stiffness having one end attached to the hollow prismatic body and the other end coupled directly to or indirectly with a base; and a plurality of electrical circuitry that allows for at least one of the hollow prismatic body and elongated cantilevers to be in electrical communication with at least one of a storage device, a charging circuit, a voltage regulating circuit, and an external load.

2. An energy harvesting device according to claim 1, wherein the hollow prismatic body is triangular, square or rectangular in shape.

3. An energy harvesting device according to claim 1, wherein the elongated cantilevers further comprise a proof mass at their ends to enhance their magnitude of vibration.

4. An energy harvesting device according to claim 1, wherein the faces of the hollow prismatic body and the elongated cantilevers are coated partially or fully with the piezoelectric layer.

5. An energy harvesting device according to claim 1, wherein the elongated cantilevers inserted through the faces of the hollow prismatic body are in an inclined orientation.

6. An energy harvesting device according to claim 1, further comprising a protection shield to cover the hollow prismatic body, the elongated cantilevers and the inner resilient means.

7. An energy harvesting device according to claim 1, further comprising an outer resilient means and a cube-shaped mass arranged in parallel and attached in between the inner resilient means and the base.

8. An energy harvesting device according to claim 7, wherein the outer and inner resilient means are springs.

9. An energy harvesting device according to claim 1, wherein the elongated cantilevers are comprised of metal and silicon.

10. An energy harvesting device according to claim 1, wherein each inner resilient means has a different stiffness to detect different types of environmentally available vibration sources.

11. An energy harvesting device according to claim 10, wherein the vibration sources are selected from the group consisting of one or more of rain drops, wind flow, movement of living being or insect, and small amount of earth vibration.

12. An energy harvesting device according to claim 1, further comprising charging circuitry, storage device, voltage regulating circuitry and other electrical components connected therewith.

13. An energy harvesting device comprising:
a hollow prismatic body formed of a plurality of faces coated with a piezoelectric layer thereon;
a plurality of elongated cantilevers arranged spatially from each other and inserted through the faces of the hollow prismatic body, the elongated cantilevers coated with a piezoelectric layer thereon;
a plurality of outer resilient means of differing stiffness each having one end coupled directly to or indirectly with a protection shield enclosing the hollow prismatic body and the other end coupled directly to or indirectly with a base; and
a plurality of electrical circuitry that allows for at least one of the hollow prismatic body and elongated cantilevers to be in electrical communication with at least one of a storage device, a charging circuit, a voltage regulating circuit, and an external load.

14. An energy harvesting device according to claim 13, wherein the hollow prismatic body is triangular, square or rectangular in shape.

15. An energy harvesting device according to claim 13, wherein the elongated cantilevers further comprise a proof mass at their ends to enhance their magnitude of vibration.

16. An energy harvesting device according to claim 13, wherein the outer and inner resilient means are springs.

17. An energy harvesting device according to claim 13, wherein the elongated cantilevers inserted through the faces of the hollow prismatic body are in an inclined orientation.

18. An energy harvesting device comprising:
a hollow prismatic body formed of a plurality of faces coated with a piezoelectric layer thereon;
a plurality of elongated cantilevers arranged spatially from each other and inserted through the faces of the hollow prismatic body, the elongated cantilevers coated with a piezoelectric layer thereon;
a plurality of outer resilient means of differing stiffness each having one end coupled directly to or indirectly with the hollow prismatic body and the other end coupled directly to or indirectly with a base; and
a plurality of electrical circuitry that allows for at least one of the hollow prismatic body and elongated cantilevers to be in electrical communication with at least one of a storage device, a charging circuit, a voltage regulating circuit, and an external load.

19. An energy harvesting device according to claim 18, wherein the elongated cantilevers further comprise a proof mass at their ends to enhance their magnitude of vibration.

* * * * *